United States Patent
Murdock

(10) Patent No.: US 10,563,666 B2
(45) Date of Patent: Feb. 18, 2020

(54) FAN BLADE WITH COVER AND METHOD FOR COVER RETENTION

(71) Applicant: United Technologies Corporation, Farmington, CT (US)

(72) Inventor: James R. Murdock, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 547 days.

(21) Appl. No.: 15/341,356

(22) Filed: Nov. 2, 2016

(65) Prior Publication Data

US 2018/0119707 A1    May 3, 2018

(51) Int. Cl.
| | |
|---|---|
| F04D 29/38 | (2006.01) |
| F02C 3/04 | (2006.01) |
| F02K 3/06 | (2006.01) |
| F04D 29/08 | (2006.01) |
| F04D 29/32 | (2006.01) |

(52) U.S. Cl.
CPC .............. *F04D 29/388* (2013.01); *F02C 3/04* (2013.01); *F02K 3/06* (2013.01); *F04D 29/083* (2013.01); *F04D 29/329* (2013.01); *F05D 2220/32* (2013.01); *F05D 2240/35* (2013.01)

(58) Field of Classification Search
CPC ........... F01D 5/147; F01D 5/16; F01D 11/008
See application file for complete search history.

(56) References Cited

U.S. PATENT DOCUMENTS

| | | | | |
|---|---|---|---|---|
| 4,650,399 A | * | 3/1987 | Craig | B23P 15/04 416/193 A |
| 5,464,326 A | * | 11/1995 | Knott | F01D 11/008 416/193 A |
| 8,066,479 B2 | * | 11/2011 | El-Aini | F01D 11/008 416/1 |
| 9,228,444 B2 | * | 1/2016 | Evans | F01D 5/225 |
| 2011/0038734 A1 | * | 2/2011 | Marra | F01D 5/147 416/96 R |
| 2011/0268562 A1 | | 11/2011 | Knight, III et al. | |
| 2013/0004331 A1 | | 1/2013 | Beeck | |
| 2014/0086751 A1 | * | 3/2014 | Bottome | F01D 11/008 416/193 R |
| 2015/0247414 A1 | * | 9/2015 | Uskert | F01D 5/282 416/190 |

FOREIGN PATENT DOCUMENTS

| | | |
|---|---|---|
| EP | 2930306 A1 | 10/2015 |
| EP | 2977552 A1 | 1/2016 |
| WO | 2015073214 A1 | 5/2015 |
| WO | 2015102715 A2 | 7/2015 |

OTHER PUBLICATIONS

European Search Report for Application No. EP 17 19 9722.

* cited by examiner

*Primary Examiner* — Woody A Lee, Jr.
(74) *Attorney, Agent, or Firm* — Cantor Colburn LLP

(57) ABSTRACT

A fan for a gas turbine engine is provided. The fan having: a rotor; a hollow fan blade having a cavity, the hollow fan blade secured to the rotor; a cover covering the cavity; a platform independent of the hollow fan blade and secured to the rotor, wherein a portion of the cover is located below a peripheral edge of the platform and the peripheral edge retains the portion of the cover in a desired location.

20 Claims, 2 Drawing Sheets under # US 10,563,666 B2

FAN BLADE WITH COVER AND METHOD FOR COVER RETENTION

BACKGROUND

Exemplary embodiments of the present disclosure are directed to a fan blade for a gas turbine engine and methods for retaining a cover of the fan blade.

A gas turbine fan blade may have hollow interior cavities enclosed with a cover. In some embodiments, the cover may be secured to the fan blade with an adhesive.

Accordingly, it is desirable to provide a fan blade with a cover and a method for retaining the cover.

BRIEF DESCRIPTION

In one embodiment, a fan for a gas turbine engine is provided. The fan having: a rotor; a hollow fan blade having a cavity, the hollow fan blade secured to the rotor; a cover covering the cavity; a platform independent of the hollow fan blade and secured to the rotor, wherein a portion of the cover is located below a peripheral edge of the platform and the peripheral edge retains the portion of the cover in a desired location.

In addition to one or more of the features described above, or as an alternative to any of the foregoing embodiments, a portion of the cavity of the hollow fan blade may be located below the peripheral edge of the platform.

In addition to one or more of the features described above, or as an alternative to any of the foregoing embodiments, a seal may be located between the portion of the cover that is located below the peripheral edge of the platform and the peripheral edge of the platform.

In addition to one or more of the features described above, or as an alternative to any of the foregoing embodiments, a recessed area may be located about a periphery of the cavity of the hollow fan blade, wherein the cover is secured to the recessed area.

In addition to one or more of the features described above, or as an alternative to any of the foregoing embodiments, the cover may be secured to the recessed area with an adhesive.

In addition to one or more of the features described above, or as an alternative to any of the foregoing embodiments, the blade may include a root portion received within a slot of the rotor.

In addition to one or more of the features described above, or as an alternative to any of the foregoing embodiments, the cover may be secured to the hollow fan blade with an adhesive.

In addition to one or more of the features described above, or as an alternative to any of the foregoing embodiments, the hollow fan blade may be a plurality of hollow fan blades and the platform may be a plurality of platforms.

In yet another embodiment, a gas turbine engine is provided. The gas turbine engine having: a fan section; a compressor section; a combustor section; a turbine section; wherein the fan section has a fan, including: a rotor; a hollow fan blade having a cavity, the hollow fan blade secured to the rotor; a cover covering the cavity; a platform independent of the hollow fan blade and secured to the rotor, wherein a portion of the cover is located below a peripheral edge of the platform and the peripheral edge retains the portion of the cover in a desired location.

In addition to one or more of the features described above, or as an alternative to any of the foregoing embodiments, a portion of the cavity of the hollow fan blade may be located below the peripheral edge of the platform.

In addition to one or more of the features described above, or as an alternative to any of the foregoing embodiments, a seal may be located between the portion of the cover that is located below the peripheral edge of the platform and the peripheral edge of the platform.

In addition to one or more of the features described above, or as an alternative to any of the foregoing embodiments, a recessed area may be located about a periphery of the cavity of the hollow fan blade, wherein the cover is secured to the recessed area.

In addition to one or more of the features described above, or as an alternative to any of the foregoing embodiments, the cover may be secured to the recessed area with an adhesive.

In addition to one or more of the features described above, or as an alternative to any of the foregoing embodiments, the blade may include a root portion received within a slot of the rotor.

In addition to one or more of the features described above, or as an alternative to any of the foregoing embodiments, the cover may be secured to the hollow fan blade with an adhesive.

In addition to one or more of the features described above, or as an alternative to any of the foregoing embodiments, the hollow fan blade may be a plurality of hollow fan blades and the platform may be a plurality of platforms.

In yet another embodiment, a method of securing fan blades to a rotor of a fan of a gas turbine engine is provided. The method including the steps of: securing a cover to a hollow fan blade having a cavity, wherein the cover encloses the cavity of the hollow fan blade; securing a platform independent of the hollow fan blade to the rotor; and inserting a portion of the hollow fan blade into a slot of the rotor in order to secure the hollow fan blade to the rotor, wherein a portion of the cover is located below a peripheral edge of the platform when the platform and the hollow fan blade are secured to the rotor and wherein the peripheral edge retains the portion of the cover in a desired location.

In addition to one or more of the features described above, or as an alternative to any of the foregoing embodiments, a recessed area may be located about a periphery of the cavity of the hollow fan blade, and the cover may be secured to the recessed area with an adhesive.

In addition to one or more of the features described above, or as an alternative to any of the foregoing embodiments, the hollow fan blade may be a plurality of hollow fan blades and the platform may be a plurality of platforms.

In addition to one or more of the features described above, or as an alternative to any of the foregoing embodiments, the cover may be secured to the hollow fan blade with an adhesive.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
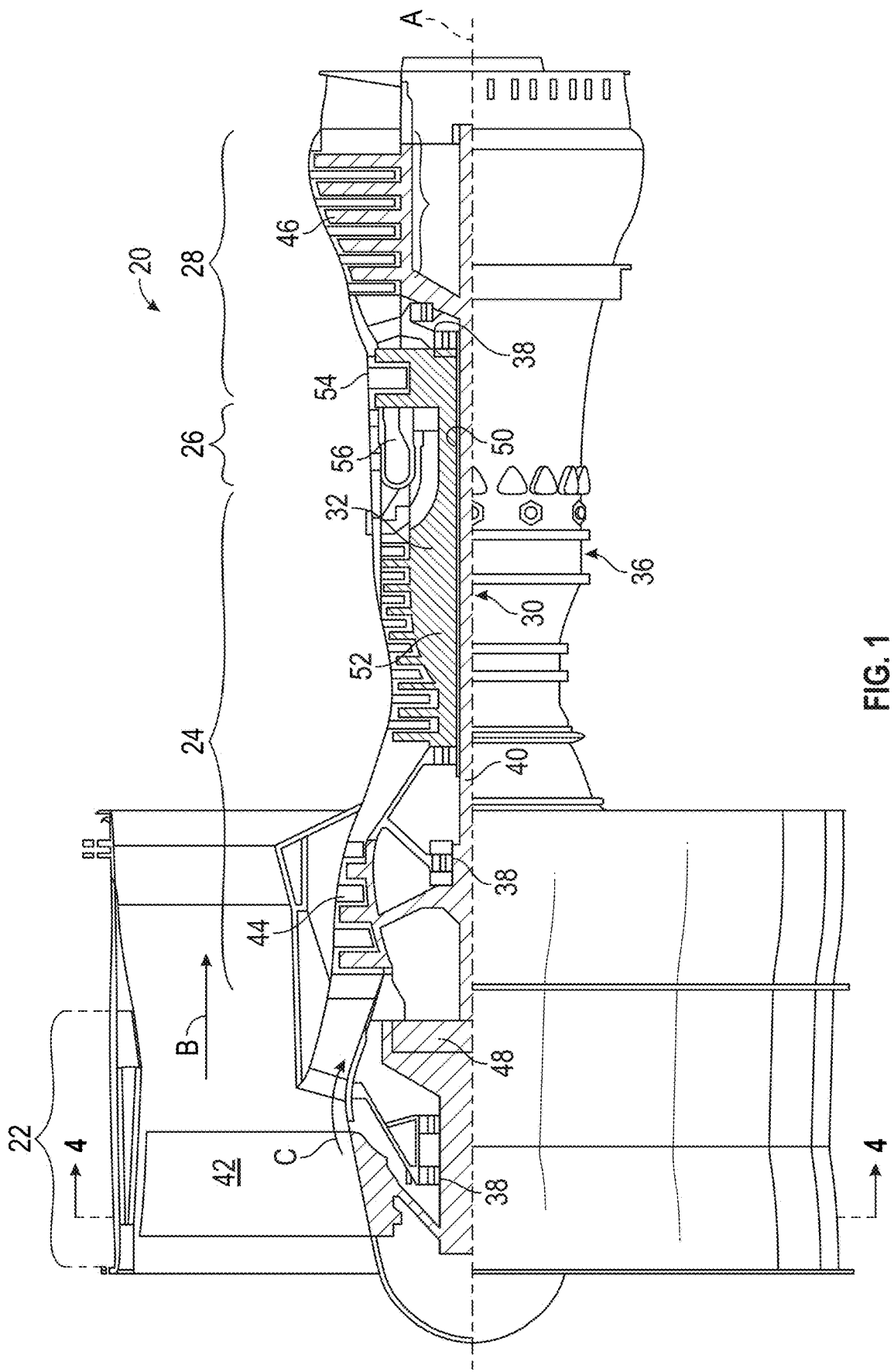
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

In a turbofan engine, lighter components generally lead to more efficient performance. If less energy is expended moving internal engine parts, more energy is available for useful work. At the same time, the components themselves must be strong enough to withstand forces typical for the operating environment and performance envelope.

Figure 2:
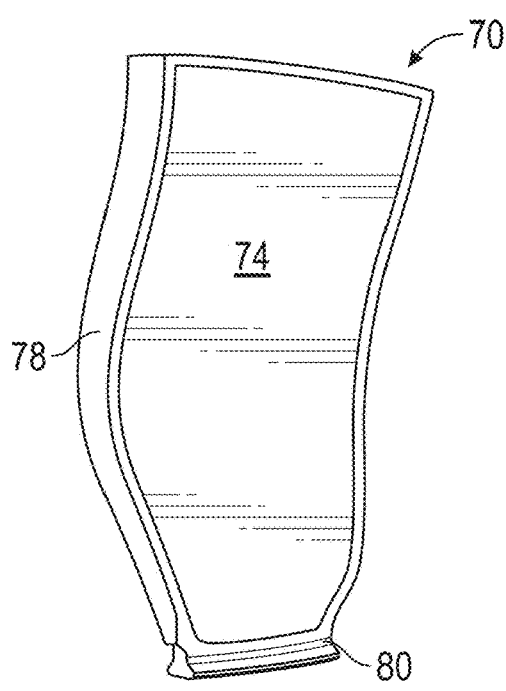
FIG. 2 is a perspective view of a fan blade in accordance with an embodiment.
Figure 3:
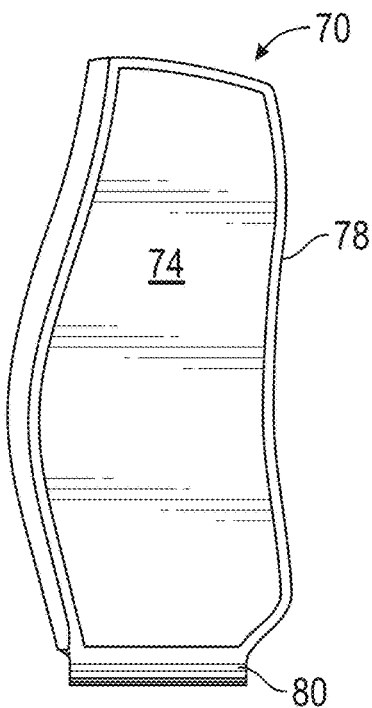
FIG. 3 is a side view of a fan blade in accordance with an embodiment.
Figure 4:
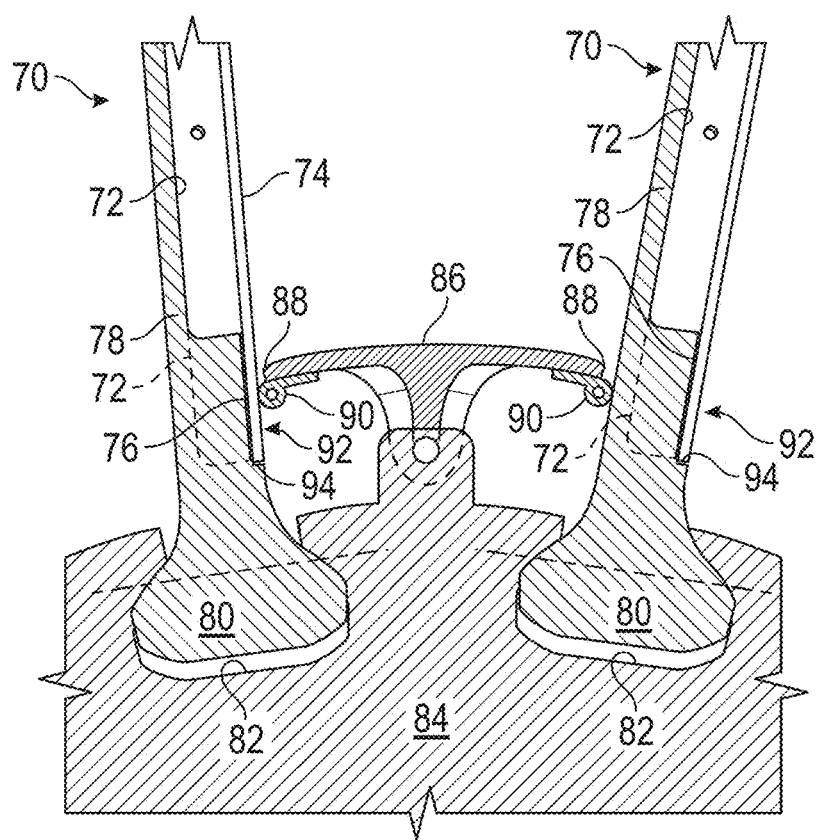
FIG. 4 is a partial cross-section view along lines 4-4 of FIG. 1, which illustrates a portion of a rotor assembly of a gas turbine engine with fan blades in accordance with an embodiment.

In order to reduce weight, the fan blades in some gas turbine engines are hollow. Referring now to FIGS. 2-4, a hollow fan blade 70 of the fan 42 of the engine 20 is illustrated. The hollow fan blade 70 has an internal cavity 72 that is enclosed by a cover or shroud 74. In one embodiment, the cover or shroud 74 is secured to the fan blade 70 by an adhesive 76 such as an epoxy, a polyurethane-based adhesive or some other type of adhesive.

Blade 70 also includes an airfoil 78 and a root 80. The root 80 is received within a slot or cavity 82 of a rotor or rotor disk 84. Here root 80 is shown as a "dovetail" root; however other configurations are considered to be within the scope of the present disclosure.

As illustrated in at least FIG. 4, the cover 74 of the blade 70 has a portion that is located below a portion of a platform or inner flow path fairing 86 of the rotor disk 84 when the blade 70 is secured to the rotor disk 84. As used herein "below" refers to the orientation illustrated in FIG. 4 or alternatively "below" may refer to being closer to the axis A of the engine 20 than a portion of the platform or inner flow path fairing 86. As illustrated, the platform 86 has peripheral edge portions 88 that are located adjacent to blades 70 when they are secured to the rotor disk 84. In one embodiment, the blades 70 are secured to the rotor 84 by for example, sliding the root 80 into the slot or cavity 82 of the rotor disk 84.

Although only a single platform 86 is illustrated it is, of course, understood that fan 42 will have a plurality of platforms 86 secured to the rotor disk 84 wherein each platform 86 is located between a pair of fan blades 70 when they are secured to the rotor disk 84. In addition and in one embodiment, each of the platforms 86 is independent and distinct from the blades 70.

Also shown in at least FIG. 4 is that the platform 86 has seals 90 located adjacent to the peripheral edge 88 of platform 86 and the cover 74 of the blade 70. By locating a portion of the cover 74 below the peripheral edge 88 of platform 86, the peripheral edge 88 of the platform 86 will provide clamping support or an external force to a lower portion 92 of the cover 74. This clamping support provides a form of mechanical retention of the cover 74 to the fan blade 70, which is in addition to the adhesive bond formed by adhesive 76.

The clamping support and/or external force of platform 86 may negate the need for additional mechanical retention of the cover 74 such as by screws, rivets or welds that may provide stress concentrations to the blade 70, which may be undesirable. The clamping support provided by platform 86 provides a means for retaining the cover 74 is a desired position should the adhesive bond of adhesive 76 fail. In one implementation, the seal 90 may assist in this clamping support or may alternatively provide the clamping support provided that the seal 90 has the required rigidity.

In one embodiment, a recessed area 94 is provided around the periphery of the cavity 72. This recessed area 94 allows for the cover 74 to be placed over cavity 72 while providing a surface for the adhesive 76 to be located to bond the cover 74 to the blade 70. Moreover and in one embodiment, the recessed area 94 has a depth of a sufficient distance from a surface of the blade 70 so that the cover 74 and the adhesive 76 can be located therein while the cover 74 is flush with an exterior surface of the blade 70. In addition and in one non-limiting embodiment, only the adhesive 76 directly secures the cover 74 to the blade 70 while the platform 86 and/or seal 90 provides an external force or mechanical clamping to the cover 74 in order to have it stay in a desired location with respect to the airfoil 78.

In one implementation, the cavity 72 is located above the platform 86 and the recessed area 94 extends below the platform 86. In an alternative embodiment, both the cavity 72 and the recessed area 94 extend below the platform 86. This extended cavity 72 is illustrated by the dashed lines in FIG. 4.

A method of securing a fan blade 70 to a rotor is also provided. In a first step, the cavity 72 and the recessed area 94 are formed in the airfoil 78. Thereafter and in a second step, the cover 74 is secured to the airfoil 78. In a third step, the blade 70 with the cover 74 is secured to the rotor 84 such that a portion 92 of the cover 74 is located below a platform 86 secured to the rotor 84 such that a peripheral edge 88 of the platform provides a mechanical retention of the cover 74 to the airfoil 78.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan for a gas turbine engine, comprising:
   a rotor;
   a hollow fan blade having a cavity, the hollow fan blade secured to the rotor;
   a cover covering the cavity;
   a platform independent of the hollow fan blade and secured to the rotor, wherein a portion of the cover is located below a peripheral edge of the platform and the peripheral edge retains the portion of the cover in a desired location.

2. The fan as in claim 1, wherein a portion of the cavity of the hollow fan blade is located below the peripheral edge of the platform.

3. The fan as in claim 1, further comprising a seal located between the portion of the cover that is located below the peripheral edge of the platform and the peripheral edge of the platform.

4. The fan as in claim 1, further comprising a recessed area located about a periphery of the cavity of the hollow fan blade, wherein the cover is secured to the recessed area.

5. The fan as in claim 4, wherein the cover is secured to the recessed area with an adhesive.

6. The fan as in claim 1, wherein the blade further comprises a root portion received within a slot of the rotor.

7. The fan as in claim 1, wherein the cover is secured to the hollow fan blade with an adhesive.

8. The fan as in claim 1, wherein the hollow fan blade is a plurality of hollow fan blades and the platform is a plurality of platforms.

9. A gas turbine engine, comprising:
   a fan section;
   a compressor section;
   a combustor section;
   a turbine section;
   wherein the fan section has a fan, comprising:
      a rotor;
      a hollow fan blade having a cavity, the hollow fan blade secured to the rotor;
      a cover covering the cavity;
      a platform independent of the hollow fan blade and secured to the rotor, wherein a portion of the cover is located below a peripheral edge of the platform and the peripheral edge retains the portion of the cover in a desired location.

10. The gas turbine engine as in claim 9, wherein a portion of the cavity of the hollow fan blade is located below the peripheral edge of the platform.

11. The gas turbine engine as in claim 9, further comprising a seal located between the portion of the cover that is located below the peripheral edge of the platform and the peripheral edge of the platform.

12. The gas turbine engine as in claim 9, further comprising a recessed area located about a periphery of the cavity of the hollow fan blade, wherein the cover is secured to the recessed area.

13. The gas turbine engine as in claim 12, wherein the cover is secured to the recessed area with an adhesive.

14. The gas turbine engine as in claim 9, wherein the blade further comprises a root portion received within a slot of the rotor.

15. The gas turbine engine as in claim 9, wherein the cover is secured to the hollow fan blade with an adhesive.

16. The gas turbine engine as in claim 9, wherein the hollow fan blade is a plurality of hollow fan blades and the platform is a plurality of platforms.

17. A method of securing fan blades to a rotor of a fan of a gas turbine engine, comprising:

securing a cover to a hollow fan blade having a cavity, wherein the cover encloses the cavity of the hollow fan blade;

securing a platform independent of the hollow fan blade to the rotor; and inserting a portion of the hollow fan blade into a slot of the rotor in order to secure the hollow fan blade to the rotor, wherein a portion of the cover is located below a peripheral edge of the platform when the platform and the hollow fan blade are secured to the rotor and wherein the peripheral edge retains the portion of the cover in a desired location.

18. The method as in claim 17, further comprising a recessed area located about a periphery of the cavity of the hollow fan blade, wherein the cover is secured to the recessed area with an adhesive.

19. The method as in claim 17, wherein the hollow fan blade is a plurality of hollow fan blades and the platform is a plurality of platforms.

20. The method as in claim 17, wherein the cover is secured to the hollow fan blade with an adhesive.

* * * * *